(12) United States Patent
Ferriss

(10) Patent No.: US 8,747,936 B2
(45) Date of Patent: Jun. 10, 2014

(54) METHOD FOR PREPARING STARCH-THICKENED COMPOSITIONS

(75) Inventor: Nancy W. Ferriss, Orange Village, OH (US)

(73) Assignee: Vita-Mix Corporation, Cleveland, OH (US)

( * ) Notice: Subject to any disclaimer, the term of this patent is extended or adjusted under 35 U.S.C. 154(b) by 289 days.

(21) Appl. No.: 12/804,436

(22) Filed: Jul. 22, 2010

(65) Prior Publication Data

US 2012/0021114 A1    Jan. 26, 2012

(51) Int. Cl.
*A23P 1/00* (2006.01)
*A23P 1/16* (2006.01)
*A23L 1/39* (2006.01)
*A23L 1/187* (2006.01)
*A23L 1/0522* (2006.01)

(52) U.S. Cl.
CPC .... *A23P 1/16* (2013.01); *A23L 1/39* (2013.01); *A23L 1/187* (2013.01); *A23L 1/0522* (2013.01)
USPC .......................................... 426/589; 426/578

(58) Field of Classification Search
CPC ............. A23P 1/16; A23L 1/39; A23L 1/187; A23L 1/0522
USPC ................................................ 426/578, 589
See application file for complete search history.

(56) References Cited

U.S. PATENT DOCUMENTS

| | | | |
|---|---|---|---|
| 3,409,443 A | 11/1968 | Polya et al. | |
| 3,962,465 A | 6/1976 | Richter et al. | 426/48 |
| 4,025,657 A | 5/1977 | Cheng et al. | 426/579 |
| 4,138,271 A | 2/1979 | Ohira et al. | 127/34 |
| 4,228,199 A | 10/1980 | Chiu et al. | 426/578 |
| 5,132,128 A * | 7/1992 | Rockland | 426/658 |
| 6,391,358 B2 | 5/2002 | Finnie et al. | 426/410 |
| 6,541,060 B2 | 4/2003 | Jeffcoat et al. | 426/578 |
| 7,045,003 B2 | 5/2006 | Klingler et al. | 106/206.1 |
| 7,267,836 B2 | 9/2007 | Graham et al. | 426/656 |
| 7,297,359 B2 | 11/2007 | Bruggeman et al. | 426/564 |
| 7,563,470 B2 | 7/2009 | Joseph et al. | 426/564 |
| 7,579,034 B2 | 8/2009 | Burling et al. | 426/603 |
| 7,585,537 B2 | 9/2009 | Merrill et al. | 426/582 |
| 2005/0048190 A1 | 3/2005 | Trksak et al. | 426/658 |
| 2007/0087102 A1* | 4/2007 | McPherson et al. | 426/549 |
| 2009/0117247 A1 | 5/2009 | Felker et al. | 426/578 |

FOREIGN PATENT DOCUMENTS

| | | | |
|---|---|---|---|
| CH | 684 567 A5 | 10/1994 | |
| EP | 1 997 389 A1 | 12/2008 | |
| GB | 2 458 472 A | 9/2009 | |
| JP | 58111652 A * | 7/1983 | |
| JP | 2008-228661 | 10/2008 | |
| WO | WO 2006/084336 | 8/2006 | C12N 15/01 |
| WO | WO 2007/113328 A1 | 10/2007 | |

OTHER PUBLICATIONS

Fanny Farmer Cookbook, 1997 Alfred knopf Publication , Dessert and Dessert sauces and Tapioca cream pudding recipe, p. 676.*
Vitamix Blender at Pleasant Hill Grain, www.Pleasanthillgrain.com, Oct. 18, 2006, pp. 3.*
Fanny Farmer Cookbook, 1997 Alfred knopf Publication, Dessert and Dessert sauces and Tapioca cream pudding recipe, p. 680.*
Food Chemistry by Fennema, 1996 Marcel Dekker Publication, General properties of some strch granules, p. 193.*
Vitamix Almond cookies and Buttermilk Pancake recipes, No date, 4 pages.*
Easy Pudding recipes from my trusty Vitamix, by Sydney Johnson, Dec. 8, 2008, pp. 6.*
International Search Report and Written Opinion (PCT/US2011/043713) (9 pages, dated Jul. 12, 2011).
Robert J. Coutrine Article: "Nouveau Larousse Gastronomique" (1967—p. 362).

* cited by examiner

*Primary Examiner* — Jyoti Chawla
(74) *Attorney, Agent, or Firm* — Renner, Kenner, Greive, Bobak, Taylor & Weber

(57) ABSTRACT

Stable starch-thickened food compositions are prepared by using high speed agitation. A method is provided that employs a blender to prepare starch-thickened soft gel compositions, including puddings, creams, and custards.

11 Claims, 1 Drawing Sheet

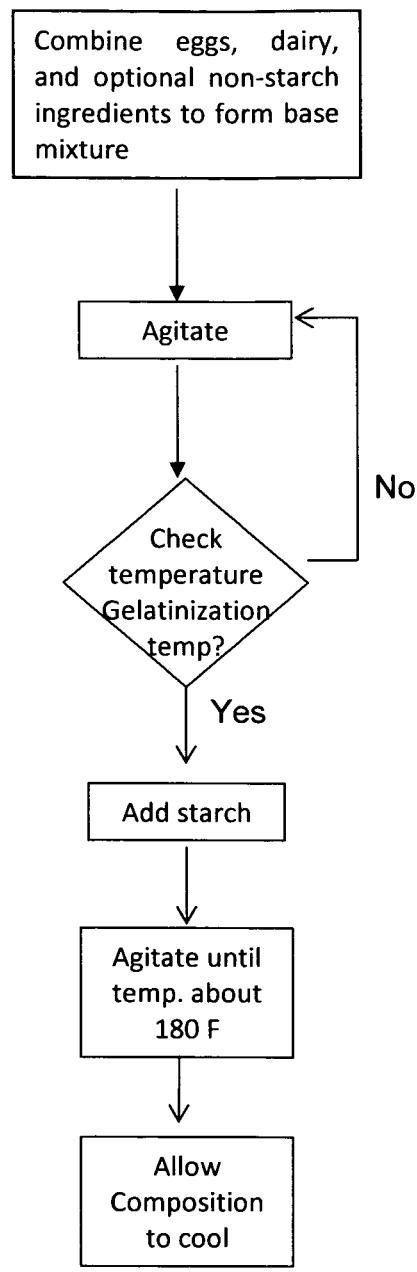

METHOD FOR PREPARING STARCH-THICKENED COMPOSITIONS

TECHNICAL FIELD

This invention relates to a method for preparing stable starch-thickened food compositions by using high speed agitation. More specifically, this invention relates to a method that employs a blender to prepare starch-thickened soft gel compositions, including puddings, creams, custards and the like.

BACKGROUND ART

Starch is a complex carbohydrate made up of two primary components: amylose and amylopectin. Starch comes from a variety of sources, and the relative amounts of amylose and amylopectin in the starch can vary depending upon the source. Sources of starch include roots/tubers (potato, tapioca, and arrowroot) and cereal (wheat, corn, rice).

The properties of different types of starch depend at least in part on the relative amounts of amylose and amylopectin. Table 1 summarizes the amounts of amylose and amylopectin found in various types of starch.

TABLE 1

| STARCH | % AMYLOSE | % AMYLOPECTIN |
| --- | --- | --- |
| Tapioca | 17 | 83 |
| Potato | 20 | 80 |
| Wheat | 25-26 | 74-75 |
| Corn | 24-28 | 72-76 |
| Waxy corn | 0 | 100 |
| Rice | 22 | 78 |

Starches with a higher amount of amylopectin, such as tapioca and potato starches, tend to be good thickening agents and form soft gels, as described below. Starches with greater amounts of amylose, such as corn starch, tend to form stronger gels. Mixtures of root and cereal starches are often used, such as mixtures of potato and corn starches.

Starch is formed as granules in the cytoplasm of plant cells. Amylopectin forms in concentric spheres with amylose dispersed in between. The granules are held together by hydrogen bonds, and swell when heated in aqueous liquids. When the granules swell, water can migrate into the spheres of the granules. The reduced free water left in the liquid causes a change in the viscosity, thickening the liquid. This process is sometimes referred to as gelatinization, and is what gives structure to baked products and thickens sauces, soups and dressings. The relative amounts of starch needed to thicken a starch-based composition can be seen in Table 2.

TABLE 2

| Type of Starch | Comparative Amount Needed to Achieve Designated Viscosity of Hot (approx 95° C.) Starch Paste |
| --- | --- |
| Potato | 1.96 |
| Waxy corn | 2.98 |
| Waxy rice | 3.13 |
| Waxy sorghum | 3.42 |
| Tapioca | 3.54 |
| Cross-linked waxy corn | 4.15 |
| Arrowroot | 4.37 |
| Sorghum | 4.66 |
| Corn | 4.90 |
| Waxy rice flour | 5.48 |
| Rice | 5.49 |
| Rice flour | 5.57 |
| Wheat | 6.44 |
| Wheat flour | 9.27 |

Adapted from Osman, E. M. and Mootse, G. 1958, *Food Res.* 23, 554.

The temperature to which the mixture must be heated to effect gelatinization of the starch is sometimes referred to as the gelatinization temperature, and will depend upon the type of starch. Other substances in the mixture, such as sugar, can raise or lower the gelatinization temperature.

As the thickened starch mixture cools, a gel is formed as hydrogen bonds hold the swelled granules in place. The amylose that was released from the granule as the water was absorbed also participates in the hydrogen bonding and gel formation. This process is sometimes referred to as gelation.

There are problems that can arise with starch-thickened products. If too many of the granules are damaged due to extreme heat or agitation, loss of viscosity or phase separation of the thickened mixture can result (scrambling). Starch mixtures are typically heated slowly, allowing a gradual swelling of the granules. The mixture is typically stirred, but vigorous agitation is avoided, so as to avoid mechanical damage to the granules.

Thus, classically prepared starch-thickened products, such as custards, require a careful cooking process. Heated milk or cream is added to an egg, sugar and starch mixture. This step is referred to as tempering. The tempered mixture is then carefully cooked to a simmer until the gelatinization temperature is reached, resulting in gelatinization (thickening) of the starch. Continual stirring and observation of the mixture is required, to avoid scorch or curdling. Fifteen to twenty minutes of labor-intensive cooking may be necessary to thicken the mixture.

The amount of heat must be carefully controlled and limited. If excessive heat is used to speed up the process, a scorched and/or scrambled product may be produced, resulting in wasted ingredients and time.

The process of thickening starch-based products is therefore time consuming, requires skill and experience, and is labor-intensive. The need exists, therefore, for a method of preparing starch-thickened compositions that is less labor-intensive and reduces the possibility of wasted ingredients and time.

DISCLOSURE OF THE INVENTION

It is an object of the present invention to provide a method for thickening starch-based products by blending.

This and other objects of the present invention, as well as the advantages thereof over existing prior art methods, which will become apparent from the description to follow, are accomplished by the improvements hereinafter described and claimed.

In general, a method for producing starch-thickened compositions includes bringing a base mixture containing non-starch ingredients to an elevated temperature in a blender adapted for high-speed agitation. The non-starch ingredients may include eggs and one or more dairy ingredients. Other optional non-starch ingredients may also be included. The base mixture is blended at a speed of at least about 20,000 rpm until the base mixture reaches a desired temperature. A root starch is added to the base mixture after the base mixture has reached a temperature that is approximately the gelatinization temperature of the starch. Blending is continued for about one minute, and the mixture forms a soft gel composition upon cooling.

BRIEF DESCRIPTION OF THE DRAWINGS

The FIGURE is a flow chart of a method according to the present invention.

PREFERRED EMBODIMENT FOR CARRYING OUT THE INVENTION

Surprisingly, it has been found that vigorous high-speed agitation, heretofore thought to be anathema to starch-thickened compositions, can be used to beneficial effect. That is, high-speed agitation can be employed to bring the non-starch ingredients to temperature quickly and without fear of scorching, so long as the starch is not present. Once the non-starch ingredients are brought to temperature, the starch is added to the heated mixture, and within about one minute high-speed agitation facilitates rapid swelling of the granules, absorption of water into the granules and the concomitant expulsion of amylose from the granules. Upon termination of the agitation and cooling of the mixture, a stable gel is formed.

Thus, the time for cooking the composition is reduced, the risk of scorch is eliminated, and the attention and skill required of the preparer is reduced, along with cost and wasted materials.

When the desired starch-thickened product is a savory pudding, custard or the like, the non-starch ingredients will include eggs, and a dairy ingredient such as milk, cream, or half and half. A sweet pudding or custard may also include sugar or other sweetener. Other optional non-starch ingredients may also be included. The combination of the non-starch ingredients will be referred to as the base mixture.

The dairy ingredient may include milk, cream, or any combination or variation thereof. Although cows are the most common source of commercially available dairy products, for purposes of this specification the term "dairy ingredient" should be interpreted to include "milk" and "cream" from cows as well as other animal sources such as goats. It should be understood that dairy alternatives, such as soy milk, rice milk, and almond milk may be also be used, however, it should be noted that starch degradation may occur more rapidly than in dairy milk products at high rates of agitation. For purposes of this specification, the term "dairy ingredient" should be interpreted to include dairy alternatives.

The sugar may include granulated cane sugar. Other types of sugar may also be employed. In certain embodiments, whole eggs may be used. In other embodiments, only the egg yolks may be used.

Other optional ingredients that may be present in the base mixture include flavoring such as vanilla extract or seeds, flour, salt, butter or margarine, cocoa, and other optional ingredients typically used in conventional recipes for puddings, custards, and other starch-thickened food products. Optionally, the vanilla and/or other volatile ingredients may be added after or toward the end of the high speed agitation, as described further hereinbelow.

The method according to the present invention may be represented schematically as in the drawing. The base mixture is prepared by combining the eggs, dairy ingredient, and optional ingredients (if any) in a blender container.

The amounts of the base mixture ingredients are not particularly limited, but may be selected based upon the capacity of the blender container. The blender container may have a capacity of up to about two liters. In some embodiments, the blender container has a capacity of from about 0.5 to about 3 liters, in other embodiments from about 1 to about 2 liters.

Examples of suitable blenders include Vita-Prep® 3, Vita-Mix® 5200, and others, available from Vita-Mix Corporation of Cleveland, Ohio. The blender should be equipped with an agitator capable of operating, at a high speed setting, at a speed of at least about 20,000 rpm. Preferably, the blender is equipped to operate, when at a high speed setting, at an agitator speed of from about 20,000 to about 30,000 rpm, more preferably from about 21,000 to about 26,000 rpm.

The friction produced by the rapid agitation of the mixture causes the temperature of the mixture to increase. The base mixture is agitated at high speed until the mixture reaches the approximate gelatinization temperature of the starch to be used. The gelatinization temperature of starch will vary based upon factors that include the type of starch, amount of water, pH, types and the concentration of salt, sugar, fat and protein in the recipe. Some types of starch start swelling at about 130° F. (54-55° C.), other types at about 150° F. (65-66° C.), other types at about 170° F. (76-77° C.), and other types at about 185° F. (85° C.). Gelatinization temperature may also depend upon the amount of damaged starch granules. Damaged granules may swell faster.

According to one aspect of the invention, the mixture is blended until the temperature of the mixture is from about 130 to about 210° F. (54.4-99° C.). According to another aspect of the invention, the mixture is blended until the temperature of the mixture is from about 150 to about 208° F. (65.52-98° C.). According to one aspect of the invention, the mixture is blended until the temperature of the mixture is from about 160 to about 200° F. (71-93° C.).

When the temperature reaches the approximate gelatinization temperature, starch is added, and agitation at high speed is continued for about 1 minute. When eggs are present in the base mixture, blending may be continued until a temperature of at least about 180° F. (85° C.) is reached.

In one aspect of the invention, the starch includes a root starch such as tapioca or potato starch or combinations thereof. The amount of starch will depend upon the desired thickness of the composition, but generally will be within conventional amounts used according to classic preparation methods. Typically, from 0.5 to about 3 tablespoons of potato starch (about 7.5 to 45 ml) is recommended to thicken one cup of liquid (about 225 ml) to the consistency desired for pudding or custard. From about 1 to about 6 tablespoons (about 15 to 90 ml) of tapioca starch is typically recommended to thicken one cup of liquid.

The starch may be added to the base mixture as a slurry. That is, the starch may be pre-mixed with water, dairy ingredient, or other liquid to form a slurry prior to adding the starch to the base mixture. The amount of liquid used to form the slurry should be taken into account when determining the overall amount of liquid to be thickened.

An example of a suitable starch is potato starch available from Bob's Red Mill. It has been found that an approximate gelatinization temperature for this starch in a mixture containing dairy ingredient, sugar and egg is about 170° F. (76.7° C.). In most embodiments, in a blender having a capacity of from 1 to 2 liters and operating at about 26,000 rpm, the non-starch mixture will reach this temperature within about 5 to 6 minutes.

After the starch is added to the base mixture in the blender, agitation at high speed is continued for about one minute, or until the temperature of the mixture reaches at least about 180° F. In a 1 to 2 liter blender operating at a speed of about 20,000 to about 30,000, preferably about 21,000 to about 26,000 rpm, it can be expected that each additional minute of agitation will increase the temperature of the mixture about 10° F. Temperatures above about 200° F. should be avoided, as they can lead to overcooking. The blender speed may then be reduced to a medium speed agitation and additional optional ingredients such as vanilla may be added. Once any optional ingredients are added, the blender is turned off, and the composition is allowed to cool. The composition will form a soft gel upon cooling.

Advantageously, the method of the present invention is simplified over classic preparation methods for puddings, custards, and other starch-thickened products. The simplified method of the present invention therefore reduces the risk of scorched product, thereby reducing waste and lowering costs. The reduced amount of time over classic methods improves productivity and reduces labor and energy costs. The hands-free method reduces labor costs and the risk of lost product. The starch-thickened composition forms a soft gel with excellent consistency and homogeneity.

In order to demonstrate the practice of the present invention, the following examples have been prepared and tested. The examples should not, however, be viewed as limiting the scope of the invention. The claims will serve to define the invention.

EXAMPLES

Example 1

Vanilla Pastry Cream Yield: 2 Cups

1¼ cups whole milk
3 egg yolks
¼ cup granulated sugar
2 tablespoons all purpose flour
2 tablespoons plus 2 teaspoons potato starch OR 5 tablespoons tapioca starch
1 teaspoon pure vanilla extract or seeds from 1 vanilla bean All ingredients except starch and vanilla were placed into a VITA-MIX® 5200 container. The lid was secured. Variable speed 1 was selected. The machine was turned on and the speed was quickly increased to 10 and then to High (about 26,000 rpm). The mixture was agitated for 5 minutes or until the mixture reached 170° F. Potato starch was mixed with an equal amount of water and stirred to create a slurry. The lid plug of the blender container was removed and the starch slurry was poured through the lid plug hole. The mixture was agitated for about one minute or until the mixture reached 180° F. The speed was reduced to Variable speed 5 and the vanilla was added. The blender was turned off and the mixture was chilled thoroughly before serving.

The result was a smooth, homogeneous soft gel with good consistency.

Example 2

Crème Anglaise Yield: 3½ Cups 1 cup half and half
1 cup heavy cream
5 egg yolks
⅓ cup granulated sugar
1 tablespoon potato starch or 2 tablespoons tapioca starch
1 teaspoon pure vanilla extract or seeds from 1 vanilla bean All ingredients except starch and vanilla were combined in a VITA-MIX® 5200 container. The lid was secured. Variable speed 1 was selected. The machine was turned on and the speed was quickly increased to 10 and then to High (about 26,000 rpm). The mixture was agitated for 5 minutes or until the mixture reached 170° F. Potato starch was mixed with an equal amount of water and stirred to create a slurry. The lid plug of the blender container was removed and the starch slurry was poured through the lid plug hole. The mixture was agitated for one minute. The speed was reduced to Variable speed 5 and the vanilla was added. The blender was turned off and the mixture was chilled thoroughly before serving.

The result was a smooth, homogeneous soft gel with good consistency.

Comparative Example 3

Vanilla Pastry Cream Yield: 2 Cups

1¼ cups whole milk
3 egg yolks
¼ cup granulated sugar
2 tablespoons all purpose flour
2 tablespoons plus 2 teaspoons potato starch OR 5 tablespoons tapioca starch
1 teaspoon pure vanilla extract or seeds from 1 vanilla bean All ingredients (including starch) except vanilla were placed into a VITA-MIX® 5200 container. The lid was secured. Variable speed 1 was selected. The machine was turned on and the speed was quickly increased to 10 and then to High (about 26,000 rpm). The mixture was agitated for 5 minutes or until the mixture reached about 180° F. The speed was reduced to Variable speed 5 and the vanilla was added. The blender was turned off and the mixture was chilled thoroughly.

The composition did not thicken homogeneously to form a soft gel. A thin, lumpy product was obtained. It is believed that the prolonged agitation and extended exposure to heat caused weakened and damaged starch granules.

In view of the foregoing, it should be evident that the method as described herein accomplishes the objects of the invention otherwise substantially improves the art.

What is claimed is:

1. A method for forming a starch-based soft gel composition, the method comprising the steps of:
   combining one or more eggs and one or more dairy ingredients, in a blender container to form a base mixture;
   blending the base mixture at a speed of from about 20,000 to about 30,000 rpm until the base mixture reaches a desired temperature of from about 130° F. to about 210° F., wherein said step of blending comprises blending for from about 5 to about 6 minutes;
   adding a root starch to the base mixture after the base mixture has reached the desired temperature, where the desired temperature is approximately the gelatinization temperature of the starch;
   continuing blending for about one minute; and
   cooling the mixture to form a soft gel composition.

2. The method of claim 1, wherein the root starch comprises tapioca starch, potato starch, or a combination thereof.

3. The method of claim 2, wherein the gelatinization temperature is about 170° F.

4. The method of claim 1, wherein said step of combining further comprises combining sugar.

5. The method of claim 1, wherein said step of continuing blending further comprises adding one or more of vanilla and other volatile flavorings.

6. The method of claim 1, wherein said step of blending comprises blending for about five minutes.

7. The method of claim 1, wherein said step of combining further comprises combining one or more of butter, margarine, flour, salt, fruit juice, water, flavoring, and spice.

8. The method of claim 1, wherein said soft gel composition is homogeneous.

9. A method of forming a starch-based soft gel composition, the method comprising:
   creating a base mixture with at least one dairy ingredient and at least one other ingredient, wherein the base mixture only includes non-starch ingredients;
   blending the base mixture for about 5 to about 6 minutes, at a high speed of from about 20,000 to about 30,000 rpm until the mixture reaches a first temperature, wherein the first temperature is from about 130° F. to about 210° F.;
   after the first temperature has been reached, adding a starch to the base mixture;
   and continuing blending the base mixture plus starch composition for about one minute.

10. The method of claim 9, wherein the at least one other ingredient in the base mixture is selected from one or more of the following: eggs, sugar, vanilla extract or seeds, flour, salt, butter or margarine, and cocoa.

11. A method of forming a starch-based soft gel composition, the method comprising:
   creating a base mixture with at least one wet ingredient and at least one dry ingredient, wherein the at least one wet and dry ingredients are selected from the following: eggs, sugar, vanilla extract or seeds, flour, salt, butter or margarine, and cocoa, and wherein the base mixture only includes non-starch ingredients;
   blending the base mixture for about 5 to about 6 minutes, at a high speed of from about 20,000 to about 30,000 rpm, until the mixture reaches a first temperature, wherein the first temperature is from about 130° F. to about 210° F.;
   after the first temperature has been reached, adding at least one starch ingredient to the base mixture; and continuing blending the base mixture plus starch composition for about one minute.

* * * * *